US006397462B1

(12) United States Patent
Lanteigne et al.

(10) Patent No.: US 6,397,462 B1
(45) Date of Patent: Jun. 4, 2002

(54) METHOD OF MANUFACTURING A CYLINDER PISTON ROD GUIDE

(75) Inventors: Eddy R. Lanteigne, Sterling Heights; Dwain L. Chalker, Madison Heights; Terrance W. Rudd, Rochester Hills; Roger R. Schumacher, Bloomfield Hills, all of MI (US)

(73) Assignee: Dynamic Seals Incorporated, Troy, MI (US)

(*) Notice: Subject to any disclaimer, the term of this patent is extended or adjusted under 35 U.S.C. 154(b) by 0 days.

(21) Appl. No.: 08/818,467

(22) Filed: Jul. 24, 1997

Related U.S. Application Data

(62) Division of application No. 08/661,996, filed on Jun. 12, 1996, now Pat. No. 5,782,162.

(51) Int. Cl.[7] .................................................. B23P 15/00

(52) U.S. Cl. ................................ 29/888.02; 29/888.04; 29/434

(58) Field of Search ..................... 29/888.044, 888.047, 29/888.02, 434, 527.4; 92/168, 165 R; 277/345

(56) References Cited

U.S. PATENT DOCUMENTS 1,652,468 A * 12/1927 Catlin
3,046,062 A * 7/1962 Wettstein
3,537,762 A 11/1970 Lodige
3,850,483 A 11/1974 Roberts et al.
4,067,093 A * 1/1978 Schumacher et al. ...... 29/527.1
4,532,856 A 8/1985 Taylor
4,756,630 A * 7/1988 Teeslink ...................... 384/30
4,987,826 A * 1/1991 Deppert et al. ......... 277/188 R
5,127,497 A * 7/1992 Struckmeyer et al. ........ 92/168
5,263,404 A 11/1993 Gaucher et al.
5,435,650 A 7/1995 Emig et al.

* cited by examiner

*Primary Examiner*—I Cuda-Rosenbaum
(74) *Attorney, Agent, or Firm*—Howard & Howard

(57) ABSTRACT

A guide (30) for surrounding and sealing a rod (26) in the end of a hydraulic cylinder (12) including a piston (24) slidably disposed in the cylinder (12) and attached to the end of the rod (26) and a method for manufacturing the guide (30). The guide (30) includes an inner guide bore (38) with dovetail shaped channels (40) extending annularly about the guide bore (38) and an organic polymeric bearing material (42) disposed in the guide bore (38) in mechanically interlocking engagement with the dovetail channel in the radial direction to exert a radial retaining force from the channel (40) to the bearing material (42) to establish a force fit in the radial direction between the channel (40) and the bearing material (42). placing the guide (30) in a mold (44, 46) defining a cylindrical cavity extending about the guide bore (38) and between the end faces (32) of the guide (30). The guide is manufactured by filling a cylindrical cavity adjacent the guide bore (38) with an organic polymeric bearing material (42) and, after curing the bearing material (42), machining a rod engaging surface (54) into the interior of the bearing material (42), the bearing material (42) being machined in reference to an to a closer tolerance than the machined surface (34) on the exterior of the guide (30).

8 Claims, 2 Drawing Sheets

METHOD OF MANUFACTURING A CYLINDER PISTON ROD GUIDE

This application is a divisional of application Ser. No. 08/661,996 filed on Jun. 12, 1996 now U.S. Pat. No. 5,782,162.

TECHNICAL FIELD

This invention relates to hydraulic cylinder assemblies and a method for manufacturing such assemblies.

BACKGROUND OF THE INVENTION

A hydraulic assembly includes a piston slidably disposed in a cylinder with a piston rod connected to the piston and extending through a guide assembly supporting a seal at one end of the cylinder. Such guide assemblies prevent hydraulic fluid from leaking about the rod. Examples of such guide assemblies are shown in U.S. Pat Nos. 4,532,856 to Taylor; 4,987,826 to Deppert et al and 5,127,497 to Struckmeyer et al.

One of the problems associated with prior assemblies is that it is very difficult and expensive to attain very close tolerances with the piston rod. Large tolerances allow the extrusion of seals into the gap between the guide material and the rod. Accordingly, the closer the tolerances between the guide material and the rod, the more effective and longer life of the seal between the guide and the rod.

SUMMARY OF THE INVENTION AND ADVANTAGES

A method for manufacturing a guide for surrounding and sealing a rod in the end of a hydraulic cylinder including a piston slidably disposed in the cylinder and attached to the end of the rod. The method comprises the steps of: forming an annular guide from metal and having end faces interconnected by an outer mounting surface and an inner guide bore; forming a least one annular channel in the guide bore; placing the guide in a mold defining a cylindrical cavity extending about the guide bore and between the end faces of the guide; filling the cylindrical cavity with an organic polymeric bearing material; curing the bearing material: and removing the guide from the mold. The method is characterized by forming the channel with a mechanical interlock in the radially inward direction and curing the bearing material to radially contract and exert a radially inwardly directed force against the mechanical interlock and machining rod engaging surface into the interior of the bearing material.

The method, therefore, produces a guide for surrounding and sealing a rod in the end of a hydraulic cylinder including a piston slidably disposed in the cylinder and attached to the end of the rod wherein the guide comprises end faces interconnected by an outer mounting surface and an inner guide bore with at least one annular channel in the guide bore and an organic polymeric bearing material disposed in the guide bore. The guide is characterized by the bearing material and the channel including a mechanical interlock in the radial direction to exert a radial retaining force from the channel to the bearing material to establish a force fit in the radial direction between the channel and the bearing material.

Accordingly, the subject invention provides an improved guide with very close tolerances between the rod and the guide to increase seal effectiveness and life.

BRIEF DESCRIPTION OF THE DRAWINGS

Other advantages of the present invention will be readily appreciated as the same become better understood by reference to the following detailed description when considered in connection with the accompanying drawings wherein.

DETAILED DESCRIPTION OF THE PREFERRED EMBODIMENT

Figure 1:
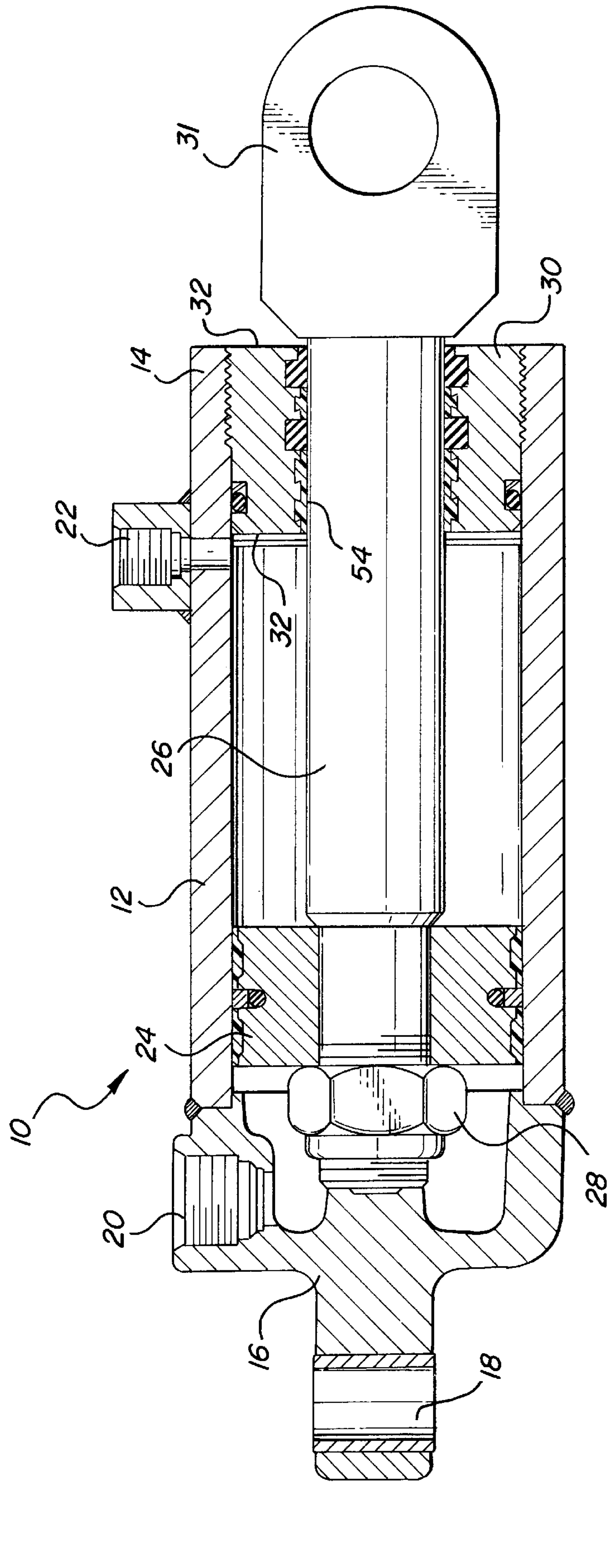
FIG. 1 is longitudinal cross sectional view of a hydraulic cylinder incorporating a preferred embodiment of the rod guide of the subject invention.

Referring to Figures, wherein like numerals indicate like or corresponding parts throughout the several views, a hydraulic cylinder assembly is generally shown at 10. The cylinder assembly 10 includes a cylinder 12 having an open end 14 and a closed end 16, the closed end 16 presenting a coupling extension 18 for connection to a support structure for reaction thereagainst. The cylinder 12 includes a fluid passages 20 and 22 for the ingress of hydraulic fluid through one of the passages and egress of fluid out of the other passage during actuation in one direction and for fluid flow in the opposite direction during actuation in the opposite direction. The actuation is accomplished by a piston 24 moving back and forth in the cylinder 12, the piston 24 being of the type disclosed in U.S. Pat. No. 4,067,093, assigned to the assignee of the subject invention. A piston rod 26 extends through the piston 24 and is secured thereto by a nut 28 on the inner end othereof. The rod 26 extends through a guide 30 to a rod coupling 31 for reaching with a member to be controlled.

Figure 2:
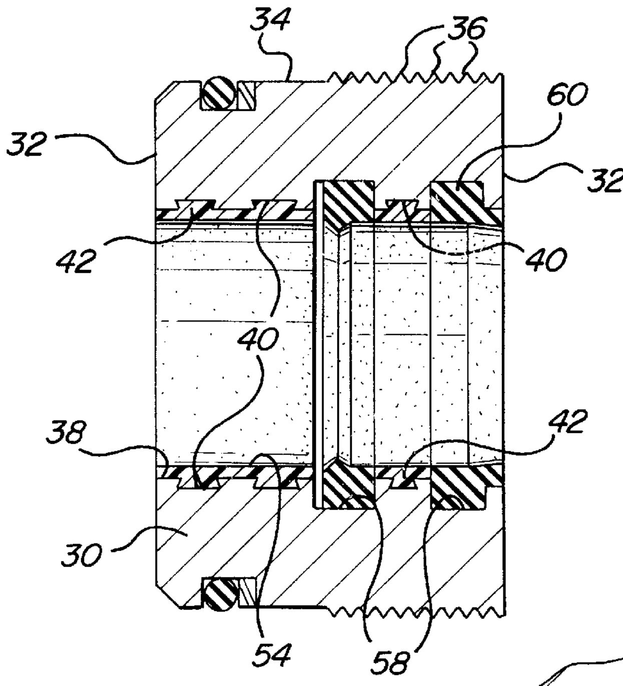
FIG. 2 is an enlarged cross sectional view of the guide of the subject invention.
Figure 4:
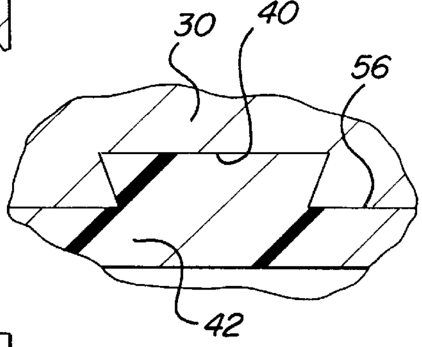
FIG. 4 is an enlarged fragmentary view of the undercut channel in the bore of the guide of the subject invention.
Figure 3:
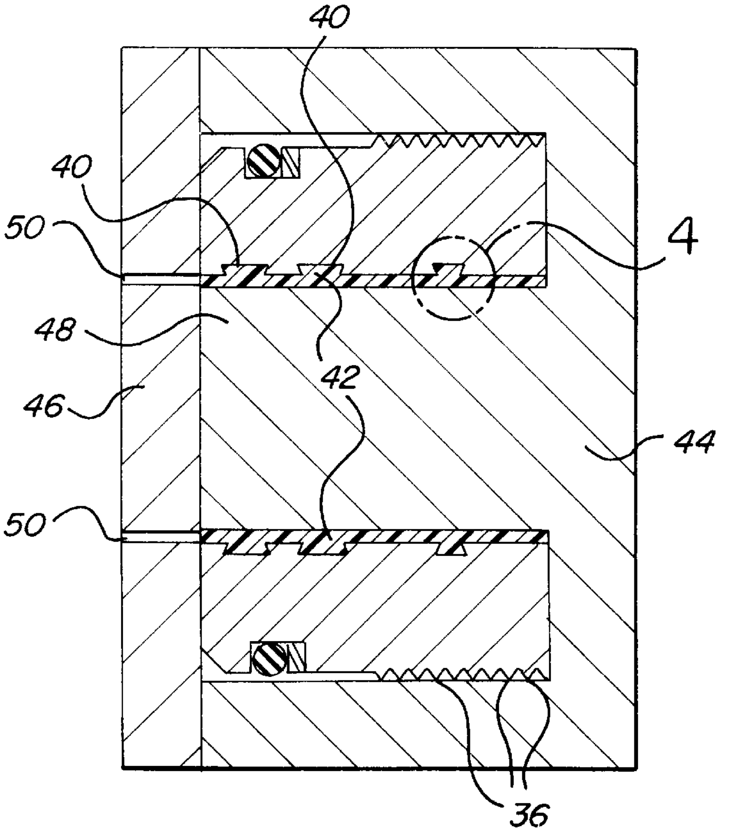
FIG. 3 is a cross sectional view of the guide in a mold with bearing material molded in the bore of the guide.

The guide 30 surrounds and seals the rod 26 in the open end 14 of the hydraulic cylinder 12. A best shown in FIG. 2, the guide 30 includes end faces 32 interconnected by an outer mounting surface 34, 36 and an inner guide bore 38. The outer mounting surface 34, 36 is divided into precisely machined gaging portion 34 and a threaded portion 36, the threaded portion 36 being in threaded engagement with the interior of the open end 14 of the cylinder 12. Instead of a threaded connection, a snap ring type connection or fastener, or the equivalent, could be used.

The guide bore 38 includes at least one, and in the embodiment shown, three annular channels 40. An organic polymeric bearing material 42 is disposed in the guide bore 38. The guide 30 is characterized by the bearing material 42 and the channel 40 including a mechanical interlock in the radial direction to exert a radial retaining force from each channel 40 to the bearing material 42 to establish a force fit in the radial direction between the channel 40 to bearing material 42. The mechanical interlock comprises an undercut extending at an acute angle relative to the guide bore 38 as viewed in the cross section. More specifically, in the preferred embodiment illustrated, the undercut is defined by a dovetail shape as viewed in cross section.

In accordance with the method for manufacturing the guide 30, after the an annular guide 30 is formed from metal with the end faces 32 interconnected by the outer mounting surface 34, 36 and an inner guide bore 38, the annular channel 40 are formed by machining in the guide bore 38. Thereafter, the guide 30 is placed in a mold 44, 46 defining a cylindrical cavity extending about the guide bore 38 and between the end faces 32 of the guide 30. The main body 44 of the mold includes a mandrel 48 extending into the guide bore 38, but in radially spaced relationship thereto ti create an annular space or cylindrical cavity around the mandrel 48 and within the guide bore 38. The guide 30 is centered in the mold by the threads 36 of the outer surface contacting the interior of the main body 44 of the mold. The other component of the mold is a cover or closure member 46.

Once the mold is closed by placing cover 46 into tight engagement with the main body 44 of the mold, the cylindrical cavity is filled or injected with the organic polymeric bearing material in the liquid and usually hot condition. Various plastics well known for bearing qualities may be utilized, and in some cases may include a dispersion of glass, graphite, minerals, or the like. The bearing material is injected through the injection passage 50 and the air, which the bearing material 42 replaces, is forced out through vent passages. After the bearing material 42 has hardened or cured sufficiently, usually by simply cooling, the guide 30 is removed from the mold and allowed to further cure, if necessary.

However, the method is characterized by forming the channels 40 with a mechanical interlock in the radially inward direction and curing the bearing material to radially contact and exert an radially inwardly directed force against the mechanical interlock. Of course, the channels 40 are machined before the guide 30 is placed in the mold 44, 46. As described above, the under cut is formed by machining in the shape of a dovetail as viewed in cross section. Accordingly, there is established an extension of the material of the guide under a portion of the bearing material 42 so that as the bearing material cures and shrinks radially inwardly, the undercut resists such shrinkage and, in fact, establishes a force fit between the bearing material 42 and the undercut of the dovetail shape.

Either before or after the bearing material 30 is molded, the gaging portion 34 of the mounting surface is machined to closer tolerance than the guide bore 38. Preferably, the machined gagging surface 34 is maintained at a tolerance of plus or minus 0.002 inch. The machined gagging surface 34 is placed in a fixture as a reference to then machine a rod engaging surface 54 into the interior if the bearing material 42 in close concentric relationship to the gagging surface 34, but to closer tolerance than the mounting surface 34. The rod engaging surface 54 is machined to a closer or tighter tolerance than the gagging surface 34 so that it is in very close engagement with the rod 26. Preferably, the rod engaging surface 54 is machined to the tolerance of plus or minus 0.001 inch and concentric to the gaging surface 34, i.e., in close tolerance concentric relationship to the mounting surface 34. Therefore, at least a portion 34 of the mounting surface has a closer tolerance than the tolerance of the finished 54 guide bore 38.

Irregularities 56 may also be formed in the direction about the inner guide bore 38 to prevent the cured bearing material 42 from rotating relative to bore 38. These irregularities may take the form of knurling, or the like. Usually, the shrink fit between the bearing material 42 and the dovetail channels 40 will be sufficient to prevent rotative movement of the bearing material 42 relative to the guide bore 38.

Irregularities 56 may also be formed in the direction about the inner guide bore 38 to prevent the cured bearing material 42 from rotating relative to the bore 38. These irregularities may take the form of knurling, or the like, Usually, the shink fit between the bearing material 42 and dovetail channels 40 will be sufficient to prevent rotative movement of the bearing material 42 relative to the guide bore 38.

In addition, annular grooves 58 are machined through the bearing material 42 into the metal of the guide 30. Before the guide is placed in service, a seal 60 is place in each annular groove 58.

A guide 30 manufactured in accordance with the subject invention will provide longer life of the seals 60 because of the closer tolerance in engaging the rod 26. In other words, the guide bore 38 provides an improved back-up for seals

60. The guide bore 38 prevents extrusion of the seals 60 to increase seal life.

The invention has been described in an illustrative manner, and it is to be understood that the terminology which has been used is intended to be in the nature of words of description rather than of limitation.

Obviously, many modification and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method for manufacturing a guide (30) for surrounding and sealing a rod (26) in the end of a hydraulic cylinder (12) including a piston (24) slidably disposed in the cylinder (12) and attached to the end of the rod (26), said method comprising the step of;

forming an annular guide (30) from metal and having end faces (32) interconnected by an outer mounting surface (34, 36) and an inner guide bore (38), forming at least one annular channel (40) in the guide bore (38), placing the guide (30) in a mold (44, 46) defining a cylindrical cavity extending about the guide bore (38) and between the end faces (32) of the guide (30), filling the cylindrical cavity with an organic polymeric bearing material (42), curing the bearing material, and removing the guide (30) from the mold (44, 46);

forming the channel (40) with a mechanical interlock in the radially inward direction and curing the bearing material (42) to radially contact and exert a radially inward directed force against the mechanical interlock and machining a rod engaging surface (54) into the interior of the bearing material (42), machining at least a portion (34) of the mounting surface to closer tolerances than the guide bore (38), machining the bearing material (42) in relationship to the machined portion (34) of the mounting surface and to a closer tolerance than the machined portion (34) of the mounting surface so that said bearing material (42) is in closer tolerance relationship to said machined portion (34) of said mounting surface than said guide bore (38).

2. A method as set forth in claim 1 further defined as forming the mechanical interlock with an undercut as viewed in the cross section.

3. A method as set forth in claim 2 defined as forming the undercut at an angle.

4. A method as set forth in claim 2 further defined as forming irregularities (56) in the direction about the guide bore (38) to prevent the cured bearing material (42) from rotating relative to said bore (38).

5. A method as set forth in claim 3 further defined as forming said undercut in the shape of a dovetail as viewed in the cross section.

6. A method as set forth in claim 5 further defined as machining an annular groove (58) through the bearing material (42) and into the guide (30).

7. A method as set forth in claim 6 further defined as inserting a seal (60) in the annular groove (58).

8. A method as set forth in claim 1 further defined as machining the machined portion (34) of the mounting surface to a tolerance of plus or minus 0.001 inches and machining the bearing material (42) to a tolerance of plus or minus 0.002 inches.

* * * * *